United States Patent Office 3,214,405
Patented Oct. 26, 1965

3,214,405
PREPARATION OF POLYCARBONATE RESINS
Bernard F. Crowe, Maplewood, N.J., assignor to Air Reduction Company, Incorporated, New York, N.Y., a corporation of New York
No Drawing. Filed July 31, 1961, Ser. No. 127,826
4 Claims. (Cl. 260—47)

This is a continuation-in-part of application Serial No. 72,312, filed November 29, 1960, now United States Patent No. 3,117,102.

This invention relates to a process for producing polycarbonate resins by reacting a diphenyl carbonate with a dihydroxy diphenyl alkane in the presence of a catalyst-antioxidant system consisting essentially of a mixture of sodium dithionite ($Na_2S_2O_4$) and 2,6-ditertiary butyl-p-cresol.

The dihydroxy diphenyl alkanes which can be used to form the polycarbonate resins according to this invention can be represented by the formula

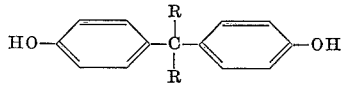

in which R is selected from the group consisting of hydrogen, unbranched or branched aliphatic hydrocarbon residues up to about 10 carbon atoms and cycloaliphatic residues. Some specific compounds coming within the scope of the above formula include 4,4'-dihydroxy-diphenyl methane; 4,4'-dihydroxy-diphenyl-1,1-ethane; 4,4'-dihydroxy-diphenyl - 1,1 - n - butane; 4,4' - dihydroxy - diphenyl-1,1-heptane; 4,4'-dihydroxy-diphenyl-1,1 - cyclopentane; and 4,4'-dihydroxy-diphenyl-1,1-cyclohexane.

Processes for preparing polycarbonate resins from dihydroxy diphenyl alkanes and diphenyl carbonates by ester interchange are well known to those skilled in the art and need not be discussed herein in any detail.

The molar ratios of the dihydroxy diphenyl alkanes and diphenyl carbonate which can be used to produce polycarbonate resins are also well known to those skilled in the art. The Canadian Patent No. 578,585 which issued to Schnell on June 30, 1959, for example, discloses various processes for the preparation of polycarbonate resins by ester radical interchange between diphenyl carbonate and a diphenyl dihydroxy alkane.

The ester interchange reaction between diphenyl carbonate and a dihydroxy diphenyl alkane can proceed in the absence of a catalyst but requires a long induction period. The use of a catalyst is thus highly desirable, if not essential, for commercial exploitation of the process. Various catalysts have been used and proposed to promote the reaction between diphenyl carbonate and a dihydroxy diphenyl alkane in the past. Although many of these prior catalysts speed up the reaction and reduce the induction period, none of those tested and used by me which sufficiently reduces the induction period have proved to be satisfactory for various reasons. Some of the prior catalysts cause side reactions resulting in the production of undesirable impurities, others result in the production of polycarbonate resins having undersirable intrinsic viscosities while others produce an undesirable color in the final polycarbonate products. The prior catalysts I have used have one or more of the above disadvantages.

This invention involves the use of a new and improved catalyst-antioxidant system, namely, a mixture of sodium dithionite and 2,6-ditertiary butyl-p-cresol, for the preparation of polycarbonate resins by ester interchange between a dihydroxy diphenyl alkane and diphenyl carbonate which not only speeds up the reaction and reduces the induction time but also eliminates the undesirable results obtained by the use of prior catalyst systems. The catalyst system of this invention produces polycarbonate resins quite readily having a molecular weight represented by an intrinsic viscosity of above about 0.4. The polycarbonate resins having an intrinsic viscosity in this range possess more desirable properties especially for the formation of supported or unsupported films. The new catalyst system also minimizes side reactions preventing the production of undesirable impurities and the formation of color bodies. The new catalyst system thus performs a dual function. It acts as a catalyst in promoting the reaction, reducing the induction period and total time of reaction, as well as an antioxidant permitting the reaction to take pace at high temperatures without resulting in significant decomposition or side reactions resulting in the production of a polycarbonate resin of a more desirable color and intrinsic viscosity.

The proportions of the sodium dithionite and 2,6-ditertiary butyl-p-cresol are catalytic. In the specific example 0.36 parts by weight of 2,6-ditertiary butyl-p-cresol and 0.06 parts of sodium dithionite were used. The total proportion of the mixture of 2,6-ditertiary butyl-p-cresol and sodium dithionite as well as the individual amounts of 2,6-ditertiary butyl-p-cresol and sodium dithionite employed to make up the total amount of catalysts are not critical. It is advantageous to maintain the total amount of catalysts at a minimum taking into account the speed of reaction desired and the properties of the final product desired. Various amounts of 2,6-ditertiary butyl-p-cresol and sodium dithionite can be used and the most advantageous amounts can be determined by routine experimentation by those skilled in the art depending upon the particular speed of reaction and end properties desired in the resulting polycarbonate resins.

The following example illustrates the preparation of a high molecular weight polycarbonate embodying the catalyst system of this invention by reaction of a dihydroxy diphenyl alkane and diphenyl carbonate. All parts are by weight.

*Example*

60.6 parts of 4,4'-dihydroxy-diphenyl-2,2-propane (bisphenol A) were mixed with 62.4 parts of diphenyl carbonate together with 0.36 parts of 2,6-ditertiary butyl-p-cresol and 0.06 part of sodium dithionite ($Na_2S_2O_4$). The reaction mixture was heated to 180° C. at 55 mm. pressure and was maintained at this temeprature and pressure for about 5½ hours. The temperature was then increased to about 200° C. and the pressure adjusted to about 1 mm. The temperature was then gradually increased and the reaction terminated at about 300° C. and 0.18 mm. The total reaction time was about 8 hours.

The bis-phenol polycarbonate resin was then recovered. The resin was a hard solid, insoluble in acetone and light tan in color, having an intrinsic viscosity of 0.42 and a melting point of 217–219° C.

A portion of the polycarbonate resin produced according to this example was admixed with 2 parts diethyl carbonate ester of 4,4'-dihydroxy-diphenyl-2,2-propane plasticizer to 1 part of the resin. The resin-plasticizer mixture was then dissolved in tertachlorethane and films cast therefrom by conventional means. The resulting films were very flexible. The film exhibited good light and heat stability and good color.

The polycarbonate resins produced according to this invention are useful in the formation of shaped articles such as films, fibers, lacquer coatings, and so forth, and in other manners known to those skilled in the art.

I claim:

1. A process of preparing polycarbonate resins which comprises reacting a dihydroxy diphenyl alkane and diphenyl carbonate by ester interchange reaction in the presence of a catalyst system comprising sodium dithionite and 2,6-ditertiary butyl-p-cresol.

2. A process of preparing polycarbonate resins which comprises reacting 4,4′-dihydroxy-diphenyl-2,2-propane and diphenyl carbonate by ester interchange in the presence of a catalyst system comprising sodium dithionite and 2,6-ditertiary butyl-p-cresol.

3. A process according to claim 2 wherein the catalyst system has a weight ratio of about 6 parts of sodium dithionite to about 36 parts of 2,6-ditertiary butyl-p-cresol.

4. A process according to claim 3 wherein the catalyst system has a weight ratio of about 6 parts of sodium dithionite to about 36 parts of 2,6-ditertiary butyl-p-cresol.

References Cited by the Examiner
UNITED STATES PATENTS

| | | | |
|---|---|---|---|
| 2,707,172 | 4/55 | Cantrell | 252—515 |
| 3,022,272 | 2/62 | Schnell | 260—47 |
| 3,028,365 | 4/62 | Schnell | 260—47 |

WILLIAM H. SHORT, *Primary Examiner.*